Jan. 14, 1969 E. BOZOYAN 3,421,544
FLUID CONTROL DEVICE
Filed Jan. 4, 1966
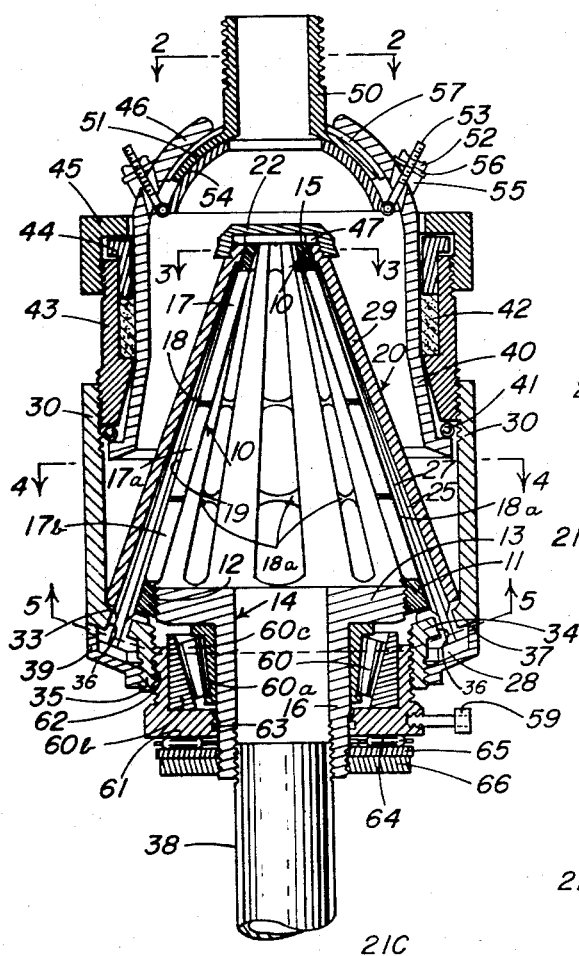
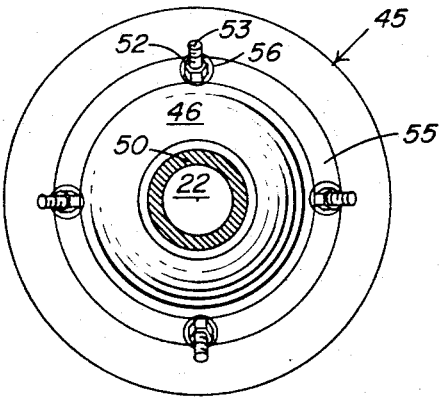
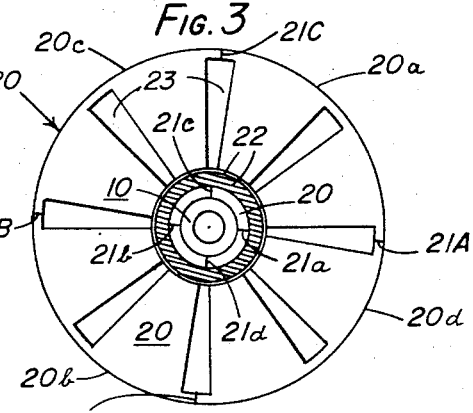
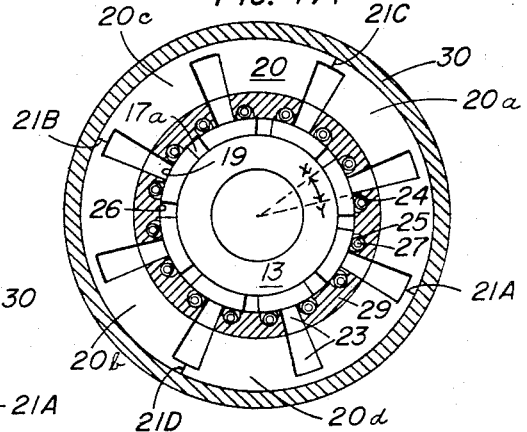
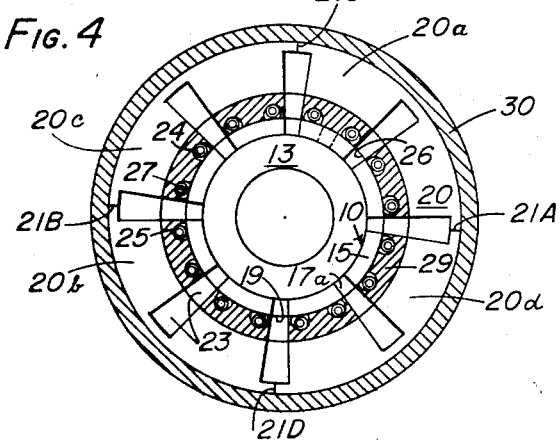
INVENTOR.
EDWARD BOZOYAN

INVENTOR.
EDWARD BOZOYAN

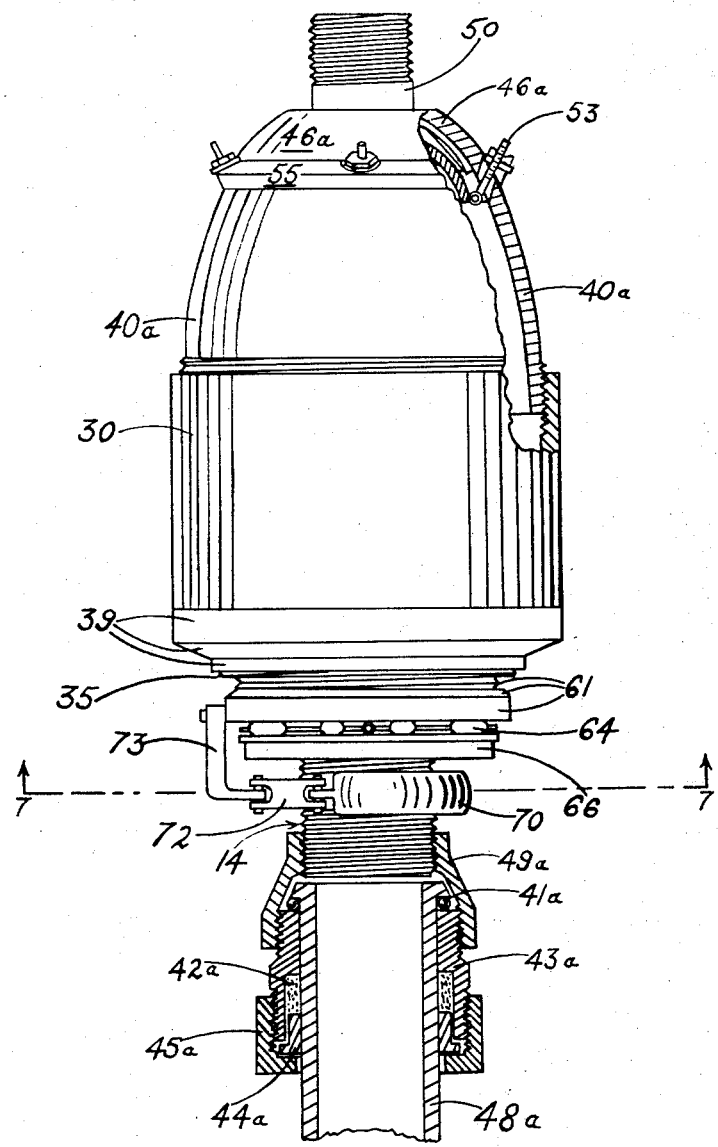

United States Patent Office 3,421,544
Patented Jan. 14, 1969

3,421,544
FLUID CONTROL DEVICE
Edward Bozoyan, 1812 West St., Union City, N.J. 07087
Continuation-in-part of application Ser. No. 319,328,
Oct. 28, 1963. This application Jan. 4, 1966, Ser.
No. 528,677
U.S. Cl. 137—505.47                               12 Claims
Int. Cl. F16k 31/12; F17d 3/00

This invention relates to improvements in fluid control devices, and more particularly to sensitive, high speed, control devices of rotary type, for regulating and proportioning automatically or remotely the flow and pressure of high-pressure power fluids. This application being a continuation-in-part of my applications filed Mar. 18, 1960, Ser. No. 15,960, which matured into Patent No. 3,110,322 on Nov. 12, 1963, and my copending application filed Oct. 28, 1963, Ser. No. 319,328, now abandoned.

Hydraulic and pneumatic control valves presently used have serious shortcomings. They are generally complex, having a multiplicity of working parts. In the most commonly used types, the cylindricals, such as spool/plunger, piston, etc., various special materials, high precision and close tolerances are required to meet different specific uses. The slightest wear or scoring affects the performance of the control valve and nothing can be done to correct the condition. They are also relatively insensitive and they have restricted fluid passageways.

Like the previous invention cited above, the present invention employs frusto-conical, mating ported interfaces for valving action. Although said previous invention overcame in large measure most of these shortcomings, further experience with it has made possible additional important improvements.

The coefficient of sliding friction in the frusto-conical type is high and the coefficient at starting is even greater; thus, this type is not sufficiently developed, and an important object of this invention is to improve this type of valves, as, for example, by providing special adjustable bearing means.

It is the general object of this invention to provide a new and improved valve the type having two frustoconical mating ported interfaces, which can be positioned between rigid pipes and it will absorb variations caused by contraction or expansion of the rigid members.

A further object of this invention is the provision of a new and better valve having frusto-conical mating ported interfaces which can be arranged in a straight line between rigid pipes and needs no additional supporting structure.

A still further object of this invention is the provision of a new and better valve having frusto-conical mating ported interfaces which can be easily cleaned and, additionally, which allows easy replacement of the seals utilized to seal the ported interfaces.

It is another object of this invention to provide two conical valve members having frusto-conical mating ported interfaces, with longitudinal sealing means at each edge of every port of one sleeve.

Another object is to provide a streamlined, high-pressure control device presenting only a negligible resistance to the flow of fluids, with a minimum pressure drop across the device.

A further important object of the invention is to render the movable element or assembly virtually free of the influences of fluid pressure and wholly unaffected by any other structural member.

It is within the contemplation of this invention to provide a balanced, low torque, and minute actuation device in combination with one or more spring tubes to control automatically or remotely the flow and pressure of fluids.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a longitudinal section of an embodiment of the invention;

FIG. 2 is a top view taken along line 2—2 of FIG. 1;

FIG. 3 is a section of FIG. 1 taken along line 3—3 of FIG. 1;

FIG. 4 is a section of FIG. 1 taken along line 4—4, showing the device in its open "on" position;

FIG. 4A is a section of FIG. 1 taken along line 4—4, showing the device in its close "off" position;

FIG. 9A is a side view similar to FIG. 9, but showing an embodiment in which the inner sleeve member and its conduit constitute the rotatable assembly.

Figure 5:
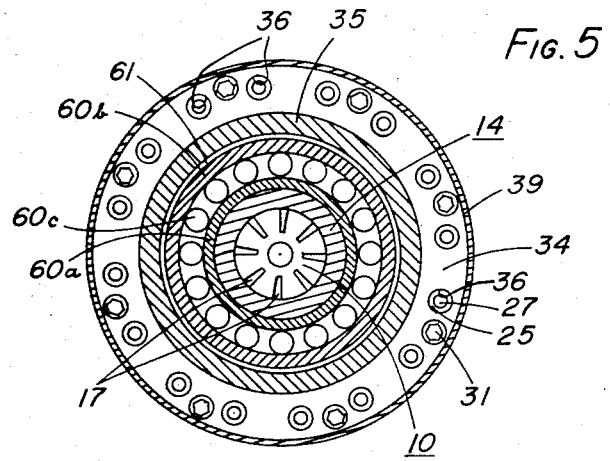
FIG. 5 is a section of FIG. 1 taken along line 5—5 of FIG. 1.
Figure 6:
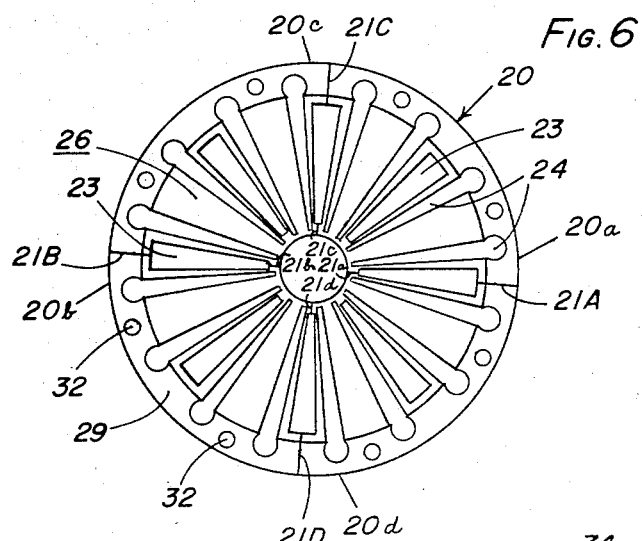
FIG. 6 is an end-view of an outer sleeve.

In the form of the invention illustrated, a high-pressure control device has a relatively stationary inner sleeve member 10 of generally conical configuration flared downwardly and outwardly and having a conical outer ported surface 19. The lower peripheral portion 11 of this sleeve 10 is thickened and contains an internally threaded portion 12 in engagement with the upper, outwardly threaded, flange portion 13 of an outlet conduit 14. Said outlet conduit 14 may be connected, through its bottom threaded portion, to piping 38. Disposed over and about the inner sleeve 10 is the outer sleeve member 20 which also has a generally conical lateral wall 29 adapted for rotatable engagement with the lateral wall 15 of said inner sleeve 10. The outer sleeve 20 is fastened to the flank or shoulder 34 of the annular housing 30 with eight screws 31 which engage in the threaded holes 32 of outer sleeve 20 (FIGS. 1, 5, and 6). A gasket or spacer 33 is provided between said outer sleeve and annular housing for preventing leakage.

Housing 30 is rotatably joined to the reducing coupling 40 which has a spherical wall 46 at its upper end (FIGS. 1 and 2). The numeral 41 indicates a conventional bearing means between components 40 and 43 to avoid high frictional resistance. Packing material 42, nipple 43, gland-member 44 and ring 45 together form a conventional leak preventing stuffing box means well known to those skilled in the art; therefore a detailed description of these parts is omitted. Coupling 40 contains at its remote end 46 the arcuate flange 51 integral with the tiltable joint 50 projecting to its outer side (FIGS. 1 and 2). This tiltable joint 50 is first aligned and connected to a power supply conduit (not shown) which may be rigid and then it is fixedly secured to wall 46 by tightening up the four nuts 52 of the swivel bolts 53 which compress the spherical collar 54 and interposed flange 51 towards the wall 46. Numeral 55 indicates an annular spacer placed over wall 46 to provide a proper seat for the nuts 52. Numeral 56 indicates simple washers under nuts 52 and 57 is a spherical gasket between wall 46 and flange 51.

Housing 30 has also a projected neck portion 35 which is internally and externally threaded. Mounted on the outlet conduit 14 is the conventional roller bearing assembly generally designated 60, operatively disposed between the inner threaded surface of neck portion 35 and said outlet conduit 14 (FIGS. 1 and 5). The details of said roller bearing assembly are not set forth as its construction is well known to those skilled in the art. Suffice it to say, for the purposes of this specification, that bearing race 60a and bearing cup 60b are in rollable engagement with the rollers 60c; so that an operative rotation between outlet conduit member 14 and the housing neck portion 35 will be facilitated, as will more clearly appear from the description hereinafter given.

In circumferential engagement with the lateral wall 16 of said conduit 14 is the adjustable flanged bushing 61. The externally threaded portion 62 of said bushing 61 is in engagement with the internally threaded portion of neck 35 (FIG. 1). Bushing 61 contains and carries said bearing cup 60b and it can be rotatably manipulated for adjusting up or down movements for said assembled outlet conduit 14 and inner sleeve 10 with respect to said outer sleeve 20. Thus an optimum positional relationship between the two sleeves may be easily and externally established and maintained as one of the main objectives of this invention. In the form illustrated, the portion above the bushing 61 is lubricant packed. Bushing 61 has a peripheral packing ring 63 in engagement with the wall 16 of conduit member 14 to effect a proper seal. Also said bushing 61 is fixed in position by lock means (not shown) and has on its periphery a reciprocating link 59 actuated, in known manner, by means not shown.

This bushing 61 constitutes a sustaining support or prop member means for said bearing assembly 60, which will hereinafter be described.

While the roller bearing assembly 60, which is heavy duty, is maintaining the sleeve members in position by preventing the high-pressure fluid medium to make recede the rotatable sleeve, another small roller bearing assembly 64 (FIGS. 1 and 9) is provided to prevent the rotatable sleeve to approach any further to the other sleeve member. Said small roller bearing assembly 64 is placed on the outer face of bushing 61. 65 is a race and 66 is the adjusting nut for bearing 64.

The said inner sleeve member 10 is preferably open at both ends and has, at its peripheral wall, three sets of inner ports 17, 17a, and 17b (FIGS. 1, 4, 4a, and 5). All of these three sets of ports are longitudinally elongated, radially and symmetrically disposed and each set is in longitudinal alignment with the others as it is clearly shown in FIG. 1. Each set is lengthwise separated from the other by wall portions of sleeve 10 forming as braces 18 and 18a. Without said braces 18 and 18a there would be only one set of ports 17 since the three sets are, as stated, in line and similarly proportioned. The arcuate spacing between ports, measured in degrees, is equal for all of said sets of ports at all levels. However, the mensural widths of these sets are not the same and even the mensural widths of each set individually, taken at different levels, are not the same; it is evident that this is due to the conical configuration of the sleeve member 10. All the ports of these 3 sets have the edges slightly chamfered for a reason hereinafter given.

Said outer sleeve member 20 is also preferably open at both ends and has at its minor end a closure cap 22, with a gasket 47 (FIG. 1), which is thread or otherwise fitted on its end. Sleeve 20 has a relatively heavy peripheral wall 29 and a set of outer ports 23 (FIGS. 6, 3, 4 and 4a). Said ports 23 are also longitudinally elongated, are radially and symmetrically disposed, and they occupy the whole available longitudinal extent of the wall 29 of sleeve 20. The number of ports 23 is the same as the number of ports 17 in the inner sleeve 10, although lengthwise the outer sleeve ports 23 cover the three sets 17 of the inner sleeve 10. Also, the arcuate widths of ports 23, measured in degrees, correspond to the widths of all the ports of inner sleeve 10 so that ports 23 may register with all the ports of inner sleeve 10.

Outer sleeve 20 is further provided, close to each edge of its ports, with longitudinal internal grooves 24 (FIGS. 6, 1, 4 and 4a). There are twice as many grooves 24 as ports 23, and they are preferably of frusto-conical configuration and so positioned along ports 23 that an equal segment is cut off (sectioned) from the conical wall of each groove, at every level, by the interior surface 26 of sleve 20. Said grooves 24 are closed at the minor end of the sleeve and open at the major end (FIGS. 1 and 6). Inserted in said grooves 24 are the longitudinal cored seals 25. Said seals 25 each consist of stem-like tapered stiff core 27 of a single straight line configuration, coated by sealing material, as by neoprene, "Teflon," buna-N, etc. The arrangement is such that at each level the diameters of the seals 25 are sensibly smaller than the diameters of the grooves 24 at that level, but due to the sectioned aspect of the grooves, as stated above, the lateral walls of seals 25 extend radially and moderately towards the outer sides of grooves 24 and on the surface 19 of said inner sleeve 10. Thus seals 25 always engage surface 19 and effect a proper sealing action when the control device is in closed or "off" position. Half of these seals 25 override the three sets of ports 17, 17a, and 17b. But seals 25 do not lean to or extend into ports 17, 17a, and 17b, due to the stiff cores of the seals, and because, in that portion of stroke the seals 25 are still in engagement with the nonported end wall portions of inner sleeve 10 and with said braces 18 and 18a. Furthermore, seals 25 do not stick or bind when engaging the edges of said ports 17 due, as stated, to the chamfered configuration of said edges.

The said grooves 24, as mentioned above, have larger diameters than seals 25 at each individual level, and have polished interiors. This permits packing said grooves 24 with a suitable lubricant, thus leaving the seals 25 to roll in said grooves and over said surface 19. This feature of rolling seals insures much longer operative life for the seals, also a better sealing performance, and a lighter rotary torque with lubricated mating interfaces for said inner and outer sleeve valve members 10 and 20.

The said annular housing 30 has on its flank 34 another set of apertures 36. Said apertures 36 (FIGS. 1 and 5) are equal in number and in alignment with said outer sleeve grooves 24. The cores 27 of said seals 25 extend through said apertures 36 and end by thrusting against the rollable washer 28, the thickness of said washer 28 determining the rank of fit of said seals 25. Thus the thicker washer 28, the farther will the seals be pushed inward into grooves 24. This end wise slight movement takes up the wear of the seals due to their tapering configuration and restores an adjusted stress of sealing surfaces exerted on the outer surface 19 on the inner sleeve 10. A readily removable and lubricant-packed bonnet 39 seals this area by engagement with the external thread of said neck portion 35, and by compressing the sealing gasket 37. The foregoing arrangement permits an easy and ready inspection, and also lubrication or renewal of said seals 25 without disturbing any piping or the positional setting of the sleeve members or any part of the control device. Further, it is to be understood that seals 25 may be inserted and removed into and from the grooves 24, after assembly and installation of the control valve, through the apertures 36 without separation of said interfaces.

To facilitate the manufacture of the device, the outer sleeve member 20 can be made in more than one piece. For instance, in the drawings it is illustrated as being in four quadrants 20a, 20b, 20c and 20d (FIGS. 6, 3, 4, and 4a). Said four quadrants are assembled at the front end by said closure cap 22 and at the other end by being fastened to the flank 34, as stated, with eight screws 31. Sealing means may be used between said quadrants if necessary, numerals 21a–21A, 21b–21B, 21c–21C and 21d–21D indicating coinciding sides of said quadrants.

In the operation of this device, a fluid medium under pressure (the power fluid) is introduced through joint 50 into the large chamber of spherical collar 54 and coupling 40. The annular housing 30, on the flank of which outer sleeve 20 is fastened, with its packing elements on its one side, as 42, 43, 44 and 45, and the bearing means on its other side, as 60, 61 and 64, forms one intermediate rotatable assembly. Thus a rotation of housing 30 will mean the same amount of rotation, figured by degrees, to the outer sleeve member 20. Inner sleeve member 10 is relatively stationary, hence it is connected to rigid piping 38 through its outlet conduit 14. Similarly, coupling 40 and joint 50 are held stationary since they are connected to the rigid supply conduit (not shown). When said assembly of housing 30 is turned through its reciprocating link 59 to bring the outer sleeve 20 to a position indicated in FIG. 4, then all the ports 23 of the outer sleeve 20 will register with all of the ports 17, 17a, and 17b of inner sleeve 10. In this position the power fluid enters the interior of the inner sleeve 10 through said last mentioned ports, past the interior of outlet conduit 14, and from there it is conducted where its pressure is utilized. This is the "on" position of the control device.

When housing 30 assembly is operatively rotated through its reciprocating link 59 to bring the outer sleeve 20 in the relative position shown in FIG. 4a, then all the ports 23 move out of register with respect to all of the ports 17, 17a, and 17b and the flow of power fluid is stopped. This is the "off" position of the device. In said "off" position, the power fluid, which is under pressure and occupies the interior of housing 30, exerts all its pressure on the surface of the inner sleeve member 10 through the ports 23. Inasmuch as said ports 23 of the outer sleeve 20 are circumferentially disposed, similarly proportioned, and symmetrically arranged, the pressures exerted on the surface 19 are radially counterbalanced and create a radial equilibrium. A similar balanced condition occurs in "on" position. However, the thrust of the pressures exerted in axial directions tends to make the rotatable sleeve member 20 recede. This thrust is dependent upon (1) the pressure differential of the fluid and (2) the total area required to close the ports. The heavy duty bearing means 60 is provided and arranged to prevent the slightest of such movements by taking up said undue pressures. Thus the frictional resistance in this device is reduced to a minimum on account of the anti-friction property of bearing 60, as one of the main objectives of this invention. It is thus apparent that this device can be operatively actuated by relatively very slight rotary torque.

It should be noted that since both the outer sleeve 20 and the inner sleeve 10 are effectively supported on the rigid pipe 38, that the assembly associated with rigid pipe 38 which includes housing 30 and packing elements 42, 43, 44 and 45 can move relative to the assembly associated with rigid pipe 50. The assembly associated with rigid pipe 50 includes spherical collar 54, arcuate flange 51, and wall 46. Accordingly, the wall 46 can move axially with respect to the packing members 42, 43, 44 and 45. If there is any expansion or contraction of the spacing between rigid pipes 38 and 50, and the valve will expand or contract by reason of the axial movement between the assembly associated with rigid pipe 38 and the assembly associated with rigid pipe 50. This axial movement will occur without affecting in any way the operation of the valve per se. The bearings 41 are operative to prevent friction between the wall 46 and the packing member 43 when the pipes 38 and 50 are separated to the fullest extent. Normally, in assembly, the wall 46 has its open end intermediately spaced over its intended length of travel so that it can absorb both contraction and expansion of the pipes 38 and 50.

It is of importance to note that the angle of rotation required to switch the device from the fully open or "on" position to the fully close or "off" position, is dependent upon the arcuate width, measured in degrees, of a sector which includes only one port 23 and one seal groove 24. This may be clearly seen by comparing FIGS. 4 and 4A (in this example the operative rotation is 22½ degrees and it is illustrated in FIG. 4A by $x-y$). Since very narrow ports and thin seals may be operatively adapted in this device, then the angle of rotation may be reduced to a relatively very small amount. It is quite evident that the aforesaid slight rotary torque with said small angle of rotation provides high-sensitivity and high-speed; a relatively smaller and simpler valve-operator for the device may therefore be used.

In addition to all kinds of conventional valve-operators, one particular operator is specially suited to this control valve; namely, the Bourdon (spring) tube. Attempts have heretofore been made by other inventions to accommodate the spring tube means to a rotary valve; but, none of them has succeeded in providing even a crudely operative combination device in the art. This failure has been due firstly to the adapted valve's having required a relatively larger angle of rotation for operation, and secondly to the method of interconnecting the two devices.

Figure 7:
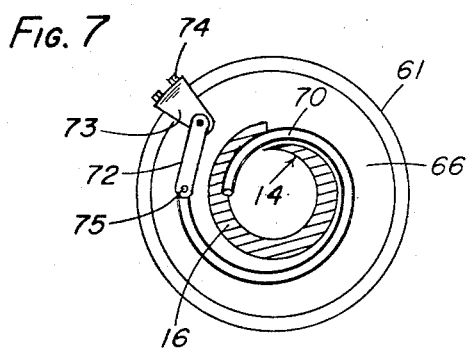
FIG. 7 is a view taken along line 7—7 of FIG. 9 showing the device in conjunction with a Bourdon tube which is in its retracted position.
Figure 7A:
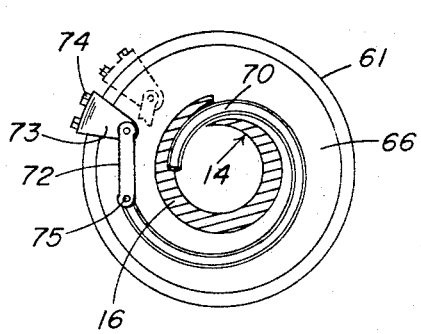
FIG. 7A is a view taken along line 7—7 of FIG. 9, showing the device in conjunction with a Bourdon tube which is in its protracted position.
Figure 9:
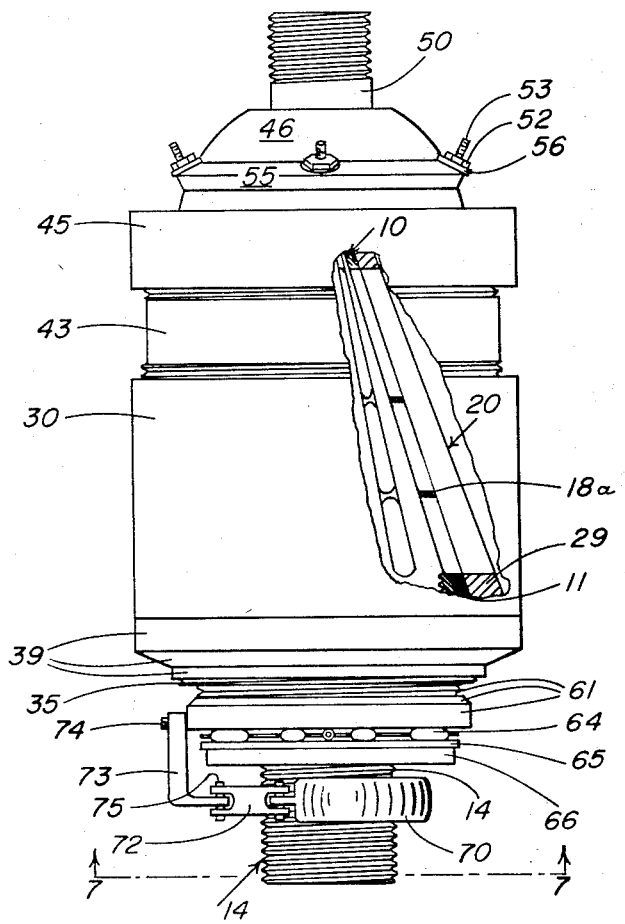
FIG. 9 is a side view partly of elevation and partly in section, illustrating the ports in fully open position.
Figure 8:
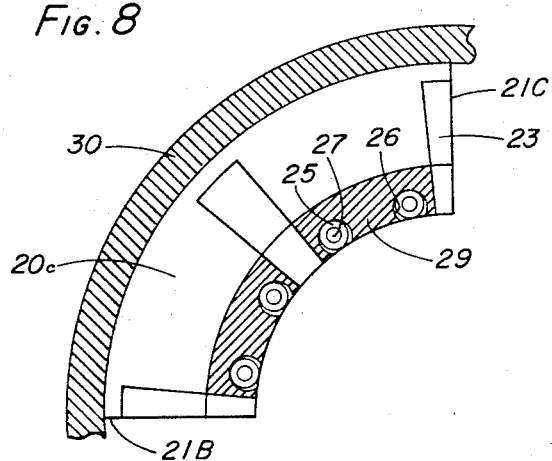
FIG. 8 is an enlarged view of a sectioned quadrant as in FIG. 4, with a portion of housing.

The spring tube has a very short, spiral travel initiated by its internal pressure differentials. Only a few specialized designs may operatively employ this travel for actuating a rotary valve. FIGS. 9, 7, and 7A represent an example of said designs.

FIG. 9 is a side view of an embodiment showing a spring tube operatively connected to the control device. Bushing 61 is locked in position (by means not shown) after being properly adjusted. The open end of spring tube 70 is fastened on the conduit 14 by a suitable means (by insertion in this example) whereby the interior of tube 70 communicates with the interior pressure of conduit 14. The closed end of tube 70 is connected to bushing 61 by means of a swivel-linkage 72 and anchor pin 73. Screws 74 fasten anchor pin 73 onto bushing 61, and numeral 75 are simple clevis pins. Where it is desired, linkage 72 may be made adjustable in any conventional manner. As it is clearly seen in FIG. 9, conduit 14 is made longer than in FIG. 1 in order to accommodate said parts.

In the operation of this embodiment, the fluid medium under pressure is introduced through conduit 14, instead of through joint 50. Sleeve members 10 and 20 are set to have their respective ports in normally-closed "off" position. Thus, the power fluid enters into spring tube 70 through its open end inserted in conduit 14, and fills up the interior of sleeve 10, stopping at ports 17, 17a and 17b since they are closed. As the pressure differential builds up in the power fluid, tube 70 "straightens out." The arrangement of the design is hence (FIGS. 7 and 7A) such that the entire spiral movement of tube 70 is favorably converted to circular rotation. The more said pressure differential increases, the more tube 70 "straightens out"; and when said pressure reaches a predetermined level, tube 70 cracks open the valve and provides a return passage for some power fluid through joint 50. This prevents said pressure from exceeding the predetermined level more than a few p.s.i. If for some reason said pressure exceeds this level, then tube 70 opens the valve further, up to the fully open position, thus relieving the pressure down to said predetermined level. As this also relieves its internal pressure, the tube recurves itself and closes the valve.

Alternatively, by making the tube 70 closed at both ends and supplying fluid to its interior from an auxiliary pressure line, then either a normally closed or a normally-open type valve may be used with it.

In the conventional fluid control devices of this type when, in "off" position, the power fluid exerts its pressure around its port(s), it has a strong tendency to penetrate between the frusto-conical mating interfaces and to seep: therefore the relative positional setting of said interfaces is made tight enough to prevent such undue seepage. Such tight setting causes several serious shortcomings; high actuation torque frequently resulting in sticking or binding (seizure); unstable lubrication because an insufficient amount of clearance is maintained between the working interfaces and the lubricant is wiped away in a short period of operation; the scoring of said interfaces, etc.

The present invention overcomes the aforesaid shortcomings in the frusto-conical type in order to realize its potential advantages. By placing the aforesaid longitudinal seals at each edge of ports 23, the danger of seepage or leakage is eliminated. Hence an optimum amount of running clearance may be established and maintained between said frusto-conical ported interfaces 19 and 26 through said bearing means 60, which acts as a thrust bearing against the aforesaid fluid pressure thrust, and adjustable bushing 61. Said running clearance permits maintaining an appropriate lubricant film at said sliding interfaces, thereby further facilitating and reducing the actuation torque and also increasing the operative life of the device. It will be noted that certain of those sealing means 25 override (if the sleeve member which carries them is the rotatable member) the ports of the other sleeve member. Or certain of these sealing means 25 are overridden (if the sleeve member which carries them is the relatively stationary member) by the ports of the other sleeve member. In both cases, said sealing means 25, as stated above, are prevented from extending into the ports which they confront, and they do not stick or bind the edges of said confronting ports on account of the arrangement explained above. Furthermore, sealings 25 may be readily inspected, adjusted or replaced, etc., just by removing bonnet 39 with large washer 28 without disturbing anything else.

It is also of importance to note that both of said sleeve valve members 10 and 20 are held in position and actuated at the same end (in this example the major ends) as clearly seen in FIGS. 1 and 3, otherwise they are free, since no member or projection is connected to said free parts of said sleeve. This arrangement is specially designed to provide for said sleeve valve members similar static and dynamic properties against temperature changes, fluid pressure velocities, contrifugal and g-forces (where required) etc. Said sleeve members are subject to no element influences.

One of the signicant advantages of the invention is that it is streamlined. Firstly, sleeve valve members 10 and 20, power fluid entrance 50 (the tiltable joint) and the outlet conduit member 14 are substantially in axial alignment with each other. Secondly ports 23 and 17 are facing said fluid entrance 50 more than in any other control device; thus the fluid path makes smaller angles in traversing across the device and this means less pressure droop (see FIGS. 3, 4, and 6).

All the ports extend obliquely from a relatively closer proximity to the center to a closer proximity of the boundary of the device. This increases the capacity of said ports, which means the fluid capacity of the device, and renders the device the most economical in space.

Reducing coupling 40 may be readily removed by unscrewing nuts 52 and nipple 43. Coupling 40 slides on the supply conduit (not shown) for the purposes of inspection, cleaning etc., so that no disturbance of piping or the positional setting of the sleeve members is necessary.

Where it is more suitable to have the inner sleeve member 10 as the roating member (FIG. 9A), then packing elements 42 to 45 and bearing means 41 are withdrawn and arranged similarly between outlet conduit 14 (more elongated if necessary as in FIG. 9) and intermediate piping 48A. In this last case the end of reducing coupling 40A is threaded or otherwise connected to annular housing 30.

In the embodiment of FIG. 9A the reference numerals 41A, 42A, 43A, 44A, 45A designate like parts of FIGS. 1 and 9. These numbers together with coupling 49A form a conventional stuffing box and facilitate a leak proof operative rotation between the conduit 14 and the piping 48A. The details of said members are not set forth as their construction is well known to those skilled in the art.

This device being compact, lightweight, of annular configuration and light in actuation, it may be readily carried by the power supply piping and can be inserted and operated in a tubular member. Should any deviation (or deflection) from alignment appear between the members connected to the ends of the device, which may be rigid, tiltable joint 50 compensates for such deviation and thus misalignment will not interfere with the operation of the device. Neither type of conventional mounting is necessary.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim in my invention:

1. In a fluid control device, an inner sleeve member having a frusto-conical outer surface with symmetrically arranged inner openings therein and a first fluid passageway means communicating continuously with the interior of said inner sleeve and with said inner openings, an outer sleeve member disposed about said inner member and having a frusto-conical inner surface mating with said outer surface of the inner member with symmetrically arranged, coactively corresponding outer openings therein and a second fluid passageway means communicating continuously with said outer openings; one of said member being rotatably oscillatable relative to the other member in order to uncover and recover its coactive openings and thereby to put in or out of communication with each other said two fluid passageway means in controlled proportions; and sealing means positioned in grooves in one of said sleeve valve members; said sealing means comprising a plurality of seal units, each individual sealing unit having a straight line configuration and extending beyond said mating surfaces, said grooves being slightly larger in width than the sealing units, thereby permitting a free and continuous rolling to said units.

2. In a fluid control device, an inner sleeve member having a frusto-conical outer surface with symmetrically arranged inner openings therein and a first fluid passageway means communicating continuously with the interior of said inner sleeve and with said inner openings, an outer sleeve member disposed about said inner member and having a frusto-conical inner surface mating with said outer surface of the inner sleeve with symmetrically arranged, coactively corresponding outer openings therein and a second fluid passageway means communicating continuously with said outer openings; one of said members being rotatably oscillatable relative to the other member in order to uncover and recover its coactive openings and thereby to put in or out of communication with each other said two fluid passageway means in controlled proportions; and sealing means positioned in grooves in one of said sleeve valve members; said sealing means comprising a plurality of seal units, each individual seal unit having a straight line configuration with the grooves being slightly larger than the seal units thereby permitting a free and continuous rolling to said seal units, each of said seal units consisting of a tapered stiff core coated by sealing material, and located in a tapered and lengthwise groove; the seal to be lubricated, extending radially beyond the groove and engaging the surface of the other sleeve member.

3. In a fluid control device, the combination according to claim 1, one of said fluid passageway means comprising a readily removable bonnet, whereby to give access to the sealing means for inspection, repair, adjustments or replacement.

4. In a fluid control device, inner and outer rotatably cooperating, axially-bored sleeve valve members with a plurality of coactively positioned inner and outer ports; a first fluid passageway means arranged to communicate continuously with the interior of said inner sleeve and its inner ports, second fluid passageway means arranged to communicate with the interior of said inner sleeve member when said coactive inner and outer ports are operatively brought into registration; means at one end of the sleeve members holding said sleeves in said position; means for operatively actuating one of said sleeve members, for a complete travel, within a range of around 22½ degrees and below of rotation; and said actuating means comprising a pressure-responsive spring tube means substantially coaxially disposed over and around one of said fluid passageway means and operatively actuating one of said sleeve members at said one end.

5. In a fluid control device, the combination according to claim 4, said device comprising a first assembly in which said inner sleeve member and said first passageway means are among the constituents fixedly secured together, a second assembly in which said outer sleeve member is among the constituents fixedly secured together; said spring tube means comprising at least one Bourdon tube, including linkage means, having one end in communication with the interior pressure of said first assembly and the other end being closed and connected to said second assembly through said linkage means; one of said assemblies being rotatable relative to the other assembly in order to bring into and out of registration said inner and outer ports and thereby allow the pressure to be built up and maintained, and to allow the flow of the fluid in use between a maximum and a minimum pressure required; said Bourdon tube being the operative actuator of the rotatable assembly; while the fluid pressure in the first assembly is below said minimum, the spring tube holds said inner and outer ports in registering position and it brings said ports out of registration as soon as said maximum pressure is reached; when a loss or use of pressure occurs, said spring tube acts immediately and compensates for said loss as quick as the fluid may move.

6. In a fluid control device, the combination according to claim 4, said device comprising a first assembly in which said inner sleeve member and said first passageway means are among the constituents fixedly secured together, a second assembly in which said outer sleeve member is among the constituents fixedly secured together; one of said assemblies being rotatable relative to the other assembly; said spring tube means comprising at least one Bourdon tube constructed and arranged to operatively actuate said rotatable assembly, said tube being in communication with an auxiliary pressure line whereby allowing a remote controlled operation.

7. As a subcombination, a removable seal member adaptable for use with mating sliding interfaces consisting of stem-like linear seal unit; said seal member having a stiff core, a resilient sealing surface, being capable of operative rolling, tapered in configuration to render same adjustable, and means for operatively adjusting said seal member.

8. In a fluid control device, a pair of rotatably cooperating inner and outer apertured sleeve valve members with frusto-conical mating interfaces; the apertured portions being coactively positioned in the arcuate surface of the inner sleeve member constituting inner ports and similarly in the arcuate surface of the outer sleeve member constituting outer ports; a first fluid passageway means in communication with the interior of the inner sleeve member and its inner ports, a second fluid passageway means in communication with the exterior of the outer sleeve member and its outer ports; one of said sleeve valve members being rotatable relative to the other member about its longitudinal axis in order to bring into and out of register said inner and outer ports; when the rotatable member is turned into one of the register or "on" positions said first and second passageways communicate with each other; when said rotatable member is turned to an "off" position the two passageways do not communicate; means for establishing and maintaining the optimal positional relationship for operative rotary movement between said inner and outer sleeve valve members, said last mentioned means including intermediate rotary bearing means disposed between surfaces formed of extensions of said arcuate surfaces for controlling the clearance between the arcuate surfaces, and support means for said intermediate rotary bearing means to adjust and maintain the spacing between said sleeve valve members, said two passageway means and said sleeve members being substantially in axial alignment with each other.

9. In a fluid control device, a pair of rotatably cooperating inner and outer apertured sleeve valve members with mating interfaces; the apertured portions being coactively positioned in the arcuate surface of the inner sleeve member constituting inner ports and similarly in the arcuate surface of the outer sleeve member constituting outer ports; intermediate rotary bearing means, disposed between surfaces formed of extensions of said arcuate surfaces for controlling the clearance between the arcuate surfaces; a prop member sustaining said bearing means, a housing in operative supporting engagement with said prop member, said bearing means and said sleeve members; a first fluid passageway means in communication with the interior of the inner sleeve member and its inner ports, a second fluid passageway means in communication with the interior of said housing and said outer ports; one of said valve members being rotatably oscillatable relative to the other member in order to bring, in controlled proportions, said inner and outer ports into and out of registration; the registration of said inner and outer ports putting said two passageway means in communication with each other; said housing having means for allowing operative rotation of one of said sleeve members, said fluid passageway means, said housing and said sleeve valve members being substantially in axial alignment with each other.

10. The fluid control device of claim 9 wherein said second passageway means includes a portion thereof which has means for allowing ready removal to expose the coactive outer ports.

11. The fluid control device of claim 10 wherein said portion is connected about said second fluid passageway, said portion being removable by axial movement whereby said portion has means to be axially moved over a rigid pipe connected to said second passageway to thereby allow cleaning of said valve ports without the necessity of disconnecting said pipe from said second fluid passageway.

12. In a fluid control device, a pair of rotatably cooperating sleeve valve members with coactively positioned inner and outer ports; a first fluid passageway means communicating with said inner ports, a second fluid passageway means communicating with said outer ports, linear longitudinally extending sealing means at the longitudinal edges of certain of the ports, and a bonnet; means for maintaining a fixed clearance between said sleeve valve members; said fluid passageway means and said sleeve valve members being substantially in axial alignment with each other; said first and second passageway means communicating with each other when the inner and outer ports are brought into register, one of said valve members having grooves, said linear longitudinally extending sealing means inserted into said grooves through one end thereof, said bonnet being removably positioned to cover said one ends of said grooves and to allow access to said grooves to thereby allow removal of said sealing means from said grooves for inspection or replacement thereof.

(References on following page)

References Cited

UNITED STATES PATENTS

| | | | |
|---|---|---|---|
| 117,853 | 8/1871 | Allen | 251—352 |
| 2,307,838 | 1/1943 | Jacobsson | 73—411 X |
| 2,377,674 | 6/1945 | Chisholm | 277—177 |
| 2,556,583 | 6/1951 | Hinz | 251—340 X |
| 2,755,136 | 7/1956 | Lum | 251—352 X |
| 3,035,811 | 5/1962 | Hamer | 251—352 X |
| 1,206,658 | 11/1916 | Berryman | 285—231 |
| 1,956,101 | 4/1934 | LeNoir | 137—625.3 |
| 2,702,716 | 2/1955 | Basolo et al. | 285—369 X |

FOREIGN PATENTS 4,996 12/1880 Great Britain.

ARNOLD ROSENTHAL, *Primary Examiner.*

U.S. Cl. X.R.

137—625.31; 251—12, 317, 345; 277—177